T. M. BEDGOOD.
Seed-Planter.
No. 21,180.
Patented Aug. 17, 1858.
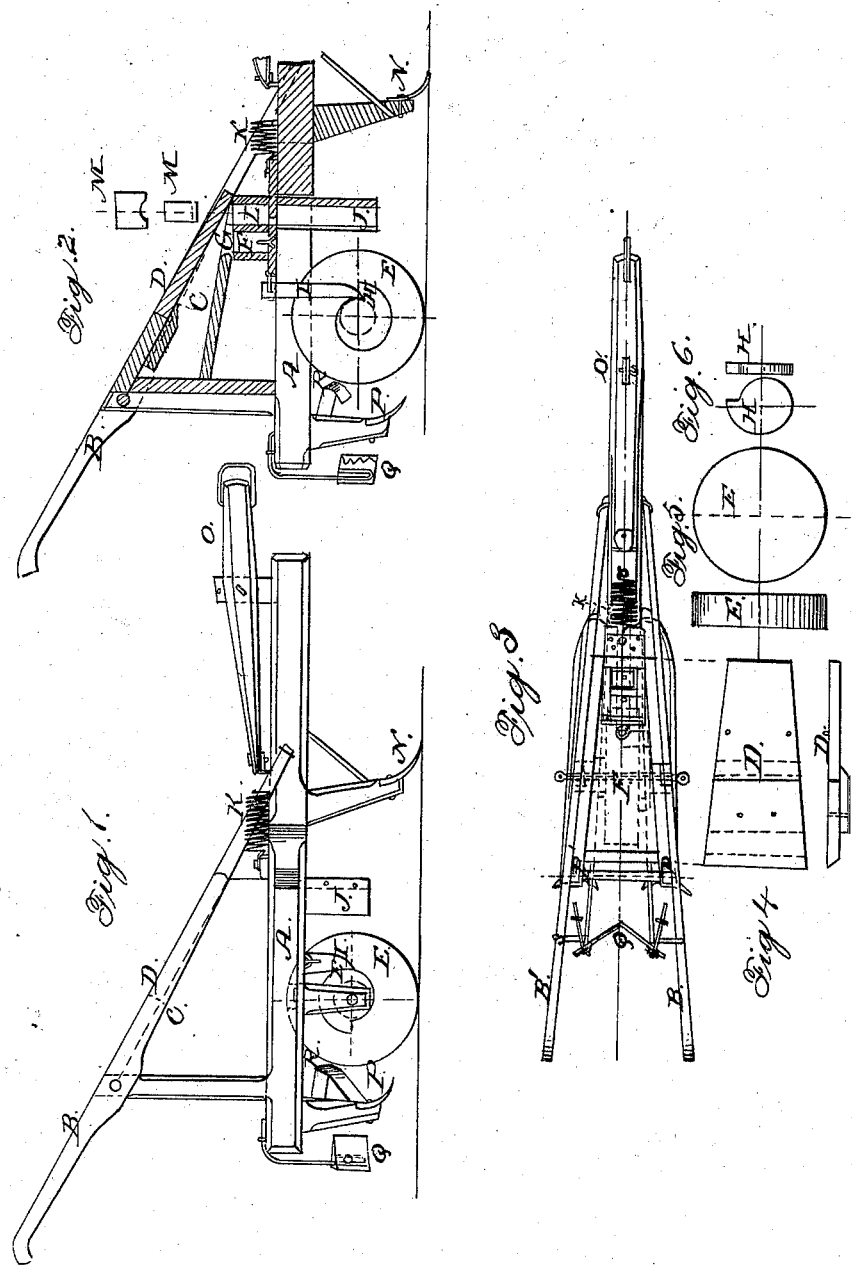

UNITED STATES PATENT OFFICE.

THOMAS M. BEDGOOD, OF CLEVELAND, INDIANA.

IMPROVEMENT IN CORN-PLANTERS.

Specification forming part of Letters Patent No. 21,180, dated August 17, 1858.

*To all whom it may concern:*

Be it known that I, THOMAS M. BEDGOOD, of Cleveland, in the county of Hancock and State of Indiana, have invented certain new and useful Improvements in Corn-Planters; and I do hereby declare that the following is a full and exact description of the same, reference being had to the accompanying drawings, and to the letters of reference marked thereon, in which—

Figure 1 is a side elevation of the planter; Fig. 2, a sectional elevation, and Fig. 3 a plan view of the same. Figs. 4 are plan and side views of the cover of the seed-box; Figs. 5, edge and side views of the truck-wheel, and Figs. 6 similar views of the cam-wheel which governs the time of the dropping of the seed.

My invention consists in so arranging and combining the several parts of the machine that the furrow is opened for the reception of the seed, the seed dropped in specified quantity and at specified distances, and covered with soil to a specified depth by it, thus performing at one operation what is usually effected by several distinct machines, in a more perfect manner and with less expense and labor.

A is the body of the machine, the sides of which are made angling to widen it at the rear to give greater capacity to the seed-box.

B B' are handles by which the course and direction of the machine are guided. They give form to the sides and top of the seed-box, as shown in the drawings; but the box may, if required, be made of greater capacity than represented, if found necessary.

C is the seed-box, in which the supply of seed to be planted is placed.

D is the cover to the seed-box, the upper part of it being made separate from the lower part, to be taken off when the box requires to be filled.

E is a truck-wheel, upon which the machine is supported and through which the planting apparatus is operated. It may either revolve upon its axle or be attached firmly to its axle and the axle be revolved in suitable boxes or bearings. When the machine is operated this truck-wheel works in the furrow made by the shovel-plow on the front part of the machine, hereinafter mentioned.

F is the planting-gage, by which the quantity of seed to be dropped is governed, and by which the seed is received from the seed-box and dropped to the furrow prepared to receive it. It is operated backward to bring it under the chute G of the seed-box to receive its measure of seed by the cam-wheel H (secured to and revolving with the truck-wheel E) and the lever I, and forward to drop its contained measure of seed to the ground through the spout J by the recoil of the spiral spring K.

L is an aperture, formed by dividing the chute G into two sections, through which the gage can be cleared of its contents in case it should become choked up. It is closed up when the machine is in use by the plug M, (shown detached in Fig. 2.)

The cam-wheel H, as shown in the drawings, operates the gage so as to make a single dropping of seed to each revolution of the truck-wheel E; but if it is desired to make two or droppings to each revolution of that wheel, a cam-wheel having as many projections or cams upon it as it is desired to make droppings may be attached in place of the cam-wheel (with a single movement) shown.

N is a shovel-plow, which opens the furrow to receive the seed. The depth of the furrow opened by it is regulated by raising or lowering the draw-bar O, to increase or diminish the height of the front end of that bar above the line of the body of the machine.

P P' are covering-plows, which throw the earth at the sides of the furrow back into the furrow upon the seed that has been planted there.

Q is an angling scraper, secured to and made adjustable upon rods attached to the rear part of the machine, so that its height may be regulated, by which clods or lumps of earth which may be thrown upon and lie on top of the earth thrown back into the furrow will be thrown off to either side of the furrow, and which regulates the depth of the earth covering the seed by scraping off the earth from the furrow-hill to a height equal to the point at which it may be set.

R is a scraper to clean the truck-wheel of earth which may attach and cling to it, and which, if unremoved, would obstruct the operation of the machine and alter the distance between the dropping of seed.

I do not claim by itself any individual part of the machine herein described; but What I do claim as my invention, and desire to secure by Letters Patent, is—

The combination of the truck-wheel E, cam-wheel H, lever I, and gage F, when constructed and arranged in relation to each other and to the seed-box C and spout J as described, and operating as set forth.

THOS. M. BEDGOOD.

Witnesses:
   ELIAS A. BARRETT,
   VINTON S. HATFIELD.